United States Patent
Wakefield

[11] Patent Number: 5,907,232
[45] Date of Patent: May 25, 1999

[54] BATTERY WITH CHARGE CONTROL CIRCUITRY

[75] Inventor: Ivan Nelson Wakefield, Cary, N.C.

[73] Assignee: Ericsson, Inc., Research Triangle Park, N.C.

[21] Appl. No.: 08/851,095

[22] Filed: May 5, 1997

[51] Int. Cl.⁶ .......................... H01M 10/44; H01M 10/46
[52] U.S. Cl. ............................. 320/130; 320/148
[58] Field of Search ..................... 320/128, 130, 320/132, 134, 136, 153, 154, 155, FOR 130, FOR 131, FOR 134, FOR 138, 148

[56] References Cited

U.S. PATENT DOCUMENTS

| | | | |
|---|---|---|---|
| 5,140,251 | 8/1992 | Wu | 320/132 |
| 5,349,282 | 9/1994 | McClure | 320/136 |
| 5,518,832 | 5/1996 | Fernandez et al. . | |
| 5,717,314 | 2/1998 | Wakefield | 320/DIG. 21 X |

FOREIGN PATENT DOCUMENTS 0 546 872   7/1992   European Pat. Off. .
0 731 545   2/1996   European Pat. Off. .

OTHER PUBLICATIONS

Garrett, S.; "Apparatus for Charging a Lithium Ion Battery in a Nickel System Charger"; Motorola Technical Developments; Aug. 1996.

*Primary Examiner*—Edward H. Tso
*Attorney, Agent, or Firm*—Jenkens & Gilchrist, P.C.

[57] ABSTRACT

Circuitry is added to charge storage devices including batteries which creates or enhances a minus delta V type of termination signal pattern to trigger a battery charger to terminate the battery charging. Circuitry, which is responsive either to a voltage or to a temperature, causes a switch to connect a load across the terminals of a battery to cause a voltage drop. The voltage drop triggers circuitry within the battery charger to terminate charging. For some applications, additional circuitry is added to cause a second switch to open to remove the load from the terminals upon the occurrence of a second specified event. The second specified event si defined by a specified voltage, temperature, or elapsed time value.

17 Claims, 4 Drawing Sheets

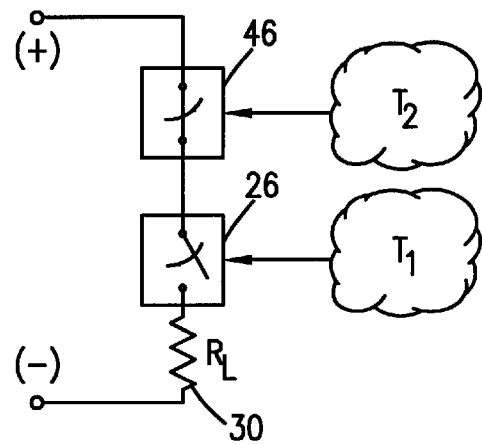
FIG. 5
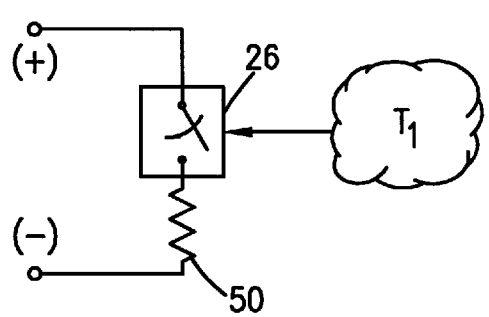 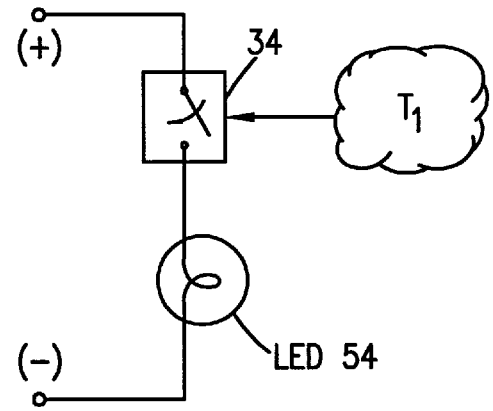
FIG. 6        FIG. 7

BATTERY WITH CHARGE CONTROL CIRCUITRY

BACKGROUND OF THE INVENTION

1. Technical Field of the Invention

The present invention relates to the field of battery charges, and, in particular, to circuitry for terminating the charge process of a battery charger.

2. Description of Related Art

Battery chargers for common Nickel Cadmium (NiCd) cell batteries and Nickel-metal-hydride (NiMH) cell batteries employ several different techniques for terminating the charge process of a battery or for a group of batteries being charged simultaneously. One technique is to terminate the charging of a battery when the battery reaches or exceeds a predefined voltage threshold or displays a specified voltage curve characteristic. Another technique involves merely charging the battery for a specified amount of time.

A problem with merely charging a battery for a specified period of time is that it is difficult to pick one time period which will serve to properly charge all batteries. Sometimes, batteries can be charged too long. In such a case, an overcharged battery can be damaged from the build up of excessive internal temperatures. To avoid this problem, a lower time period should be used. However, a related problem then is that some batteries will not be charged a sufficient amount.

Because the approach of merely charging a battery for a specified period of time is overly simplistic and generally inadequate, other approaches have been developed to terminate the charge process of a battery. One such approach is known as minus delta V termination (MDVT). MDVT processes measure the voltage across the battery's terminals until a peak voltage has been obtained. Once a charger determines that the voltage across the battery terminals is less than a peak value (i.e., there is a negative slope to the voltage charge curve), the charge process is terminated. One problem with the MDVT process, however, is that the negative voltage slope can become undetectable some times. For instance, when a battery is operating at an elevated temperature, the negative voltage slope is frequently undetectable.

Other types of batteries cannot be charged by a charger that uses MDVT termination. For instance, lithium-ion, rechargeable alkaline, lead-acid and Rechargeable Alkaline Manganese (RAM) batteries do not display a negative voltage slope after reaching a maximum charge. Accordingly, there currently exists a need for different types of chargers for these batteries, which renders existing and common battery chargers mostly useless in this regard. As the need for higher capacity and lighter weight batteries increases, the proliferation of these newer battery types will also increase. This, in turn, will make perfectly good MDVT chargers obsolete. Moreover, the chargers for these newer types of batteries may become more complex and expensive as new methods are developed to terminate a charge process. There is a need, therefore, for batteries to be compatible with chargers that use a minus delta V termination process.

SUMMARY OF THE INVENTION

A rechargeable battery includes circuitry to make it compatible with minus delta V termination type chargers so that the battery can be charged in common MDVT chargers. The battery circuitry includes control circuitry and an electrically operable switch connected in series with a load. The switch and load are shunted with the battery terminals. The control circuitry, which operates the switch, can be either temperature or voltage activated. Accordingly, when a predetermined voltage or temperature threshold is reached, the control circuitry temporarily activates the switch to close and cause the load to produce a voltage drop across the terminals. The drop in voltage triggers the charger to stop charging. The battery control circuitry may be placed within any type of battery to enhance or create the necessary MDVT characteristics for terminating a charge from an MDVT type charger.

BRIEF DESCRIPTION OF THE DRAWINGS

A better understanding of the method and apparatus of the present invention may be obtained by reference to the following Detailed Description when taken with the accompanying Drawings wherein:

FIG. 5 is a circuit diagram of the selectable load according to a second embodiment of the invention;

FIG. 6 is a circuit diagram of the selectable load according to a fourth embodiment of the invention;

FIG. 7 is a circuit diagram of the selectable load according to a fifth embodiment of the invention;

DETAILED DESCRIPTION OF THE DRAWINGS

Figure 1:
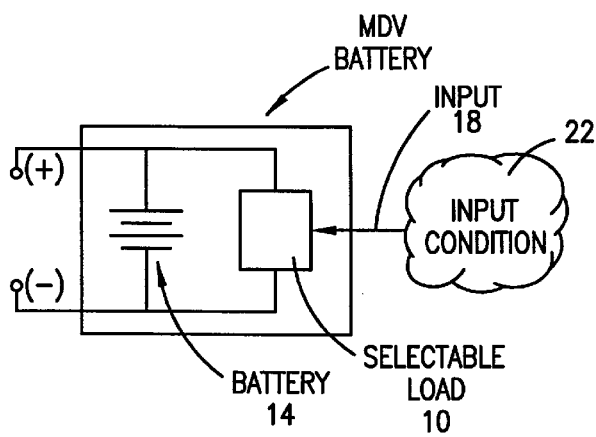
FIG. 1 is a block diagram illustrating a first embodiment of the present invention.

FIG. 1 is a block diagram illustrating a first embodiment of the present invention. Referring now to FIG. 1, a selectable load 10 is connected across the positive and negative terminals of a battery 14. Selectable load 10 includes an input 18 for receiving an input condition 22. The nature of the input condition 22 which causes selectable load 10 to become selected depends upon the internal components of selectable load 10. For example, if selectable load 10 includes a temperature sensitive coupling device, the input condition might comprise a battery temperature. For another example, if the selectable load includes a selectable switch and circuitry for receiving and analyzing a voltage, the input condition might consist of a measured voltage.

In operation, selectable load 10 is selected or connected to the positive and negative terminals of the battery whenever a specified condition reflects that the battery should be fully charged. For example, it is known that the battery reaches a known voltage level once it is charged. For other batteries, it is known that the battery will reach a specified temperature whenever the battery is adequately charged.

Once a battery reaches a charged condition, as indicated either by the voltage across its terminals or by its temperature, the selectable load is placed across the battery terminals. Placing the selectable load across the battery terminals causes a measurable voltage drop to be induced across the battery terminals. Accordingly, if a conventional minus-delta-V-termination charger is being utilized, the voltage drop is detected by the charger and charging is terminated.

Figure 2:
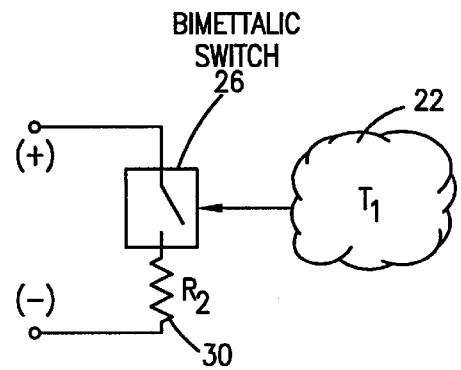
FIG. 2 is a circuit diagram of a selectable load according to a second embodiment of the invention.

FIG. 2 is a circuit diagram of the selectable load according to a second embodiment of the invention. Referring now to FIG. 2, a bimetallic switch 26 is connected in series with a load resistor 30. The bimetallic switch 26 is coupled to detect a battery temperature 22. As the battery 14 of FIG. 1 is charged and its internal temperature increases, the bimetallic switch 26 will remain open until the internal battery temperature reaches a specified level. Once the specified level is obtained, bimetallic switch 26 is operable to close and to connect the resistive load across the terminals of battery 14. In general, a bimetallic switch is selected to complete the circuit at a temperature value known to indicate that the battery 14 is adequately charged. By way of example, an internal temperature of 50–60° F. (close to the exterior of the battery) may typically reflect that a battery is fully charged for certain types of batteries.

For the circuit of FIG. 2, a 200-Ohm load is placed in series with the selectable bimetallic switch. A value of 200-Ohms is selected to create a sufficient voltage drop across the battery 14 terminals while minimizing the amount of actual power dissipated by the load. For example, a 200-Ohm load draws 25 milliamperes from a 5-volt battery. If the bimetallic switch remains closed for five minutes, approximately 2.1 milliampere-hours of energy are dissipated across the load. Because a modern battery typically used in cellular phones can store one thousand milliampere-hours of energy, energy dissipated across the load resistor will be negligible if a 200-Ohm resistor is used.

Figure 3:
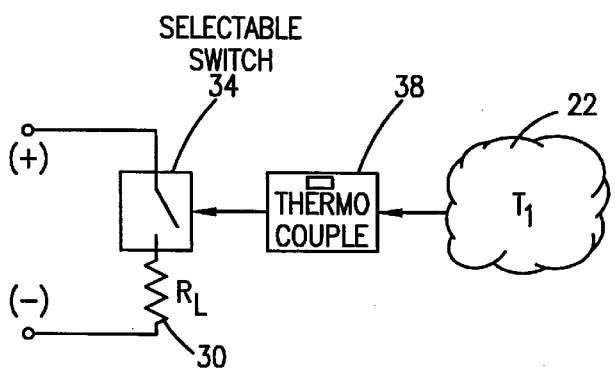
FIG. 3 is a circuit diagram of the selectable load according to a third embodiment of the invention.

FIG. 3 is a circuit diagram of the selectable load according to a third embodiment of the invention. Referring now to FIG. 3, a selectable switch 34 is used in place of a bimetallic switch 26. The selectable switch 34 is connected to receive a logic signal output by a logic device 38 which comprises a thermocouple. The thermocouple of logic device 38, like the bimetallic switch 26, is coupled to detect a battery temperature 22. Once battery temperature 22 reaches a specified level, the thermocouple of logic device 38 produces and outputs a signal to selectable switch 34 to cause selectable switch 34 to close. As described earlier, resistor 30 is shunted across the terminals of battery 14 and causes the voltage level therefrom to drop. The voltage drop causes the minus delta V termination charger to cease charging battery 14.

Figure 4:
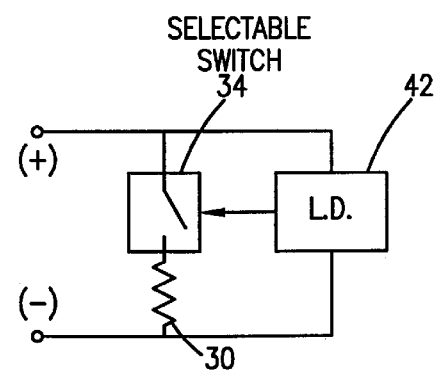
FIG. 4 is a circuit diagram of the selectable load according to a first preferred embodiment of the invention.

FIG. 4 is a circuit diagram of the selectable load according to a first preferred embodiment of the invention. Referring now to FIG. 4, a selectable switch is placed in series with a resistor 30. Instead of using a logic device 38 comprising a thermocouple, the circuit of FIG. 4 includes a logic device 42 which is shunted across the terminals of battery 14. The logic device 42 comprises an analog-to-digital voltage converter which is coupled to sense the voltage across the terminals of the battery 14. Once the battery 14 is fully charged, the voltage across the terminals will reach a specified voltage potential. The logic device 42 is operable to produce a logic signal to selectable switch 34 which causes selectable switch 34 to close. Preferably, logic device 42 produces a logic "1" signal to trigger selectable switch 34 whenever the measured voltage across the terminals of the battery 14 exceeds a specified threshold voltage.

FIG. 5 is a circuit diagram of the selectable load according to a second preferred embodiment of the invention. Referring now to FIG. 5, the selectable load 10 of FIG. 1 comprises a normally open bimetallic switch 26 and a load resister 30 in series therewith similar to that shown in FIG. 2. In addition, a normally closed bimetallic switch 46 is placed in series with bimetallic switch 26 and load resistor 30. Bimetallic switch 46 is coupled to detect a temperature produced by the load resistor 30. Accordingly, once bimetallic switch 26 closes and current is conducted through load resistor 30, bimetallic switch 46 opens as heat is generated by load resistor 30. Once the circuit is broken by the opening of bimetallic switch 46, the battery is thus prevented from being unnecessarily drained.

One desirable application of the circuit of FIG. 5 is for batteries that are likely to be charged in a high temperature environment. By way of example, if the battery charger is likely to be used within a hot motor vehicle, use of the embodiment of FIG. 5 will be beneficial in preventing unnecessary current drain. The reason for this result is that a high temperature environment will cause bimetallic switch 25 to remain closed for a longer period. Accordingly, the inclusion of a second bimetallic switch selected to be opened at a temperature that would be reached by the load resistor reduces unnecessary current drain from the battery.

FIG. 6 is a circuit diagram of the selectable load according to a fourth embodiment of the invention. Referring now to FIG. 6, a temperature sensitive bimetallic switch 26 is placed in series with a positive temperature coefficient thermistor 50 to form the selectable load 10 of FIG. 1. One reason to use positive temperature coefficient thermistor 50 in place of a load resistor 30 is to achieve similar results to the circuit of FIG. 5. In other words, a function of the circuit of FIG. 6 is to reduce the amount of unnecessary current drain from the charged battery after the bimetallic switch 26 closes. Once bimetallic switch 26 closes and power is dissipated in thermistor 50, thermistor 50 will increase in resistance as it is heated. The increasing resistance reduces current flow through the thermistor thereby reducing discharge from battery 14.

FIG. 7 is a circuit diagram of the selectable load according to a fifth embodiment of the invention. Referring now to FIG. 7, the load resistor 30 of FIG. 2 is replaced with a light emitting diode 54. Accordingly, power is dissipated by the light emitting diode once bimetallic switch 26 closes. An advantage of using a light source similar to light emitting diode 54 to dissipate the power is that the light produces visual confirmation that the battery is fully charged. Although the light emitting diode will only remain "ON" while bimetallic switch 26 is closed, the use of a light is beneficial when a user is waiting for the battery to become charged.

Figure 8:
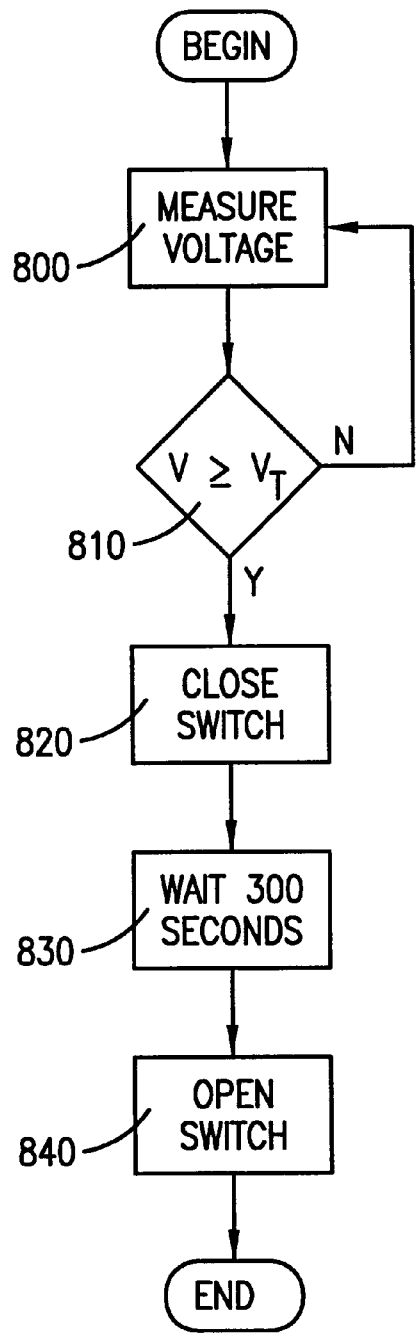
FIG. 8 is a logic flow diagram illustrating a method of producing a minus delta V termination type of voltage drop according to a second preferred embodiment of the invention.

FIG. 8 is a logic flow diagram illustrating a method of producing a minus delta V termination type of voltage drop according to a second preferred embodiment of the invention. Referring now to FIG. 8, the method generally includes the step of measuring a voltage across the battery terminals to trigger the circuitry to display a minus delta V termination characteristic when the battery is charged. Accordingly, the first step is for a logic device 42 to measure a voltage across the battery terminals as the battery is being charged (step 800) After the voltage is measured, the logic device determines whether the battery voltage equals or exceeds a specified threshold voltage (step 810). While the battery voltage is below the specified threshold voltage level, the logic device will continue to measure the voltage as the battery is charged. A typical specified threshold level is 1.5 volts.

Once the logic device 42 determines in step 810 that the threshold voltage level has been reached, it produces a signal (e.g., a logic "1") to cause the selectable switch 34 to close (step 820). The logic device then waits a specified amount of time before it produces a signal to the selectable switch to cause it to open (step 830). In one embodiment, the specified amount of time that the logic device waits 300 seconds. Thereafter, the logic device produces a signal (e.g., logic "0") to cause the selectable switch to open (step 840).

Figure 9:
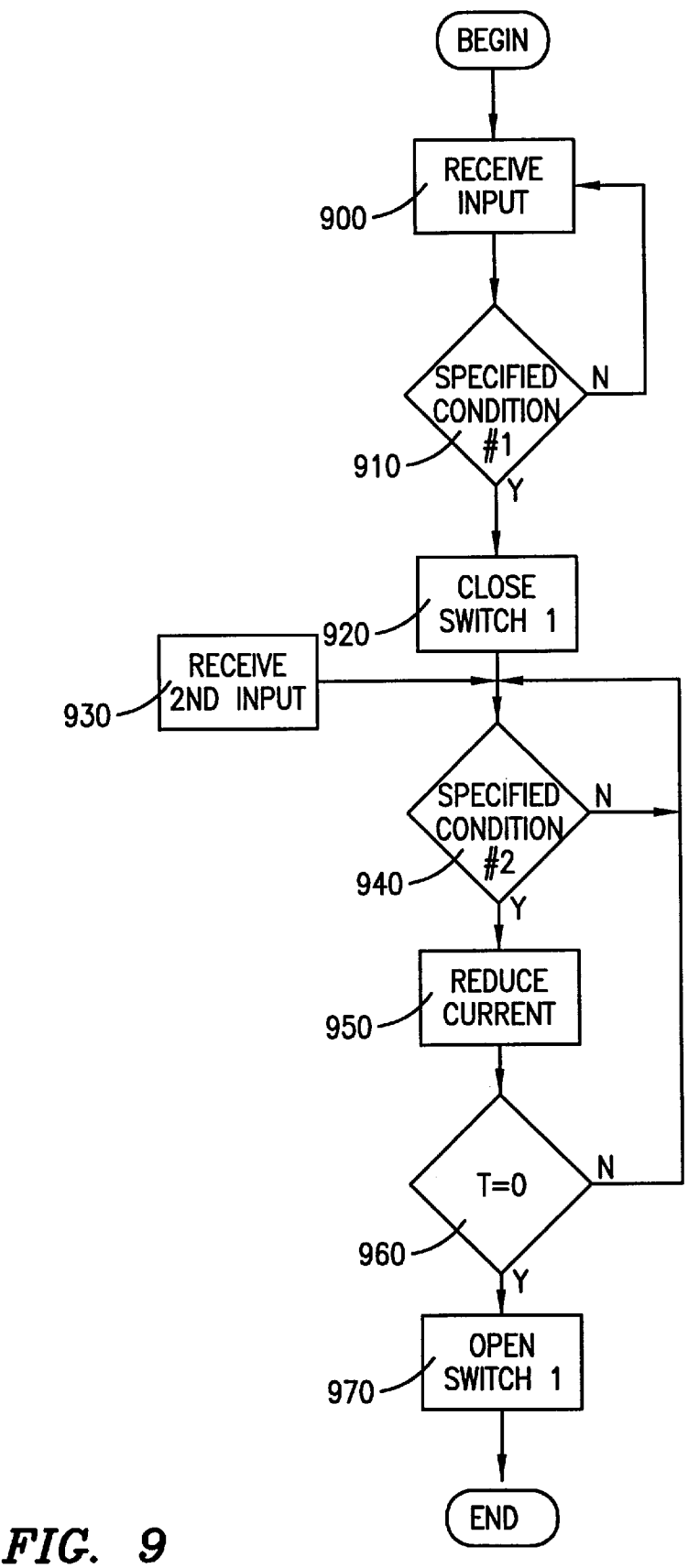
FIG. 9 is a logic flow diagram illustrating a method of producing a minus delta V termination type of voltage drop according to a sixth embodiment of the invention.

FIG. 9 is a logic flow diagram illustrating a method of producing a minus delta V termination type of voltage drop according to a sixth embodiment of the invention.

Referring now to FIG. 9, the method generally includes receiving an input condition and closing a switch to create a minus delta V characteristic whenever the input condition reaches a specified state. More specifically, for example, the first step is to initially receive the input condition (step 900) at the logic device 42. Thereafter, a logic device 42 determines whether the received input condition has reached a specified state (e.g., voltage condition) (step 910). If not, the input condition is continuously received (step 900). Once it is determined that the specified state has been reached, however, a first switch 26 is closed to create the minus delta V termination characteristic for the battery being charged.

After the first switch 26 is closed, a second input condition is received (step 930). This second input is received if a second bimetallic switch 46 is being used in the circuit as was discussed above with respect to FIG. 5. For the system of FIG. 5, the second input condition would be a temperature. Once the second input condition reaches a specified stated, e.g., a defined temperature, current flow is reduced (step 950). For example, if a circuit of the embodiment of FIG. 6 is being used, current flow is reduced by increasing the resistance of the load thermistor 50, placed across the battery terminals. If a circuit of the embodiment of FIG. 5 is being used, current flow is reduced to zero by opening the second bimetallic switch 46.

As discussed above, the input condition may be either a voltage or a temperature. Any of the circuits for the selectable load 10 as shown in FIGS. 2 through 7 may be used to carry out the inventive methods of FIGS. 8 and 9. Thus, if a bimetallic switch or an equivalent device (e.g., a thermocouple with a selectable switch) is used, the input condition is temperature. In such a case, the specified temperature is the temperature which is known to indicate that the battery being charged is fully charged. By way of example, charging will terminate if a nickel metal hydride (NIMH) type of battery is being used and the specified temperature of 60° C. is reached, which temperature indicates that there exists a full charge or that charging will terminate because the battery is too hot. If a selectable switch and also a logic device which includes an analog-to-digital converter are used, then the input condition is the voltage across the battery terminals. For such an embodiment, it is understood that the logic device includes inputs connected across the battery terminals.

Each of the above discussed Figures illustrates circuitry which is to be included within a charge storage device for producing a minus delta V termination characteristic as described above. Such circuitry is operable to trigger a conventional battery charger for NiCd batteries (or the like) to terminate charging for batteries which do not produce an MDVT signal characteristic adequate to prompt a charger to terminate charging. Thus, the use of the present circuitry allows older technology chargers to be used with new technology batteries that do not, ordinarily, produce a minus delta V termination characteristic upon becoming fully charged. Thus, a significant amount of waste is prevented because the older chargers will not be needlessly discarded.

Although an embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, the disclosed circuitry or a modification thereof could be made as an add-on device for adding onto a battery while the battery is being charged. As another example, the disclosed circuitry could be added to existing NiCd batteries as a type of retrofit circuitry.

What is claimed is:

1. A charge storage device chargeable by a minus delta V termination charger having a plus terminal and a minus terminal, comprising:

a battery connected between the plus terminal and the minus terminal; and a selectable load circuit connected between the plus terminal and the minus terminal the selectable load circuit selectively connectable in parallel with the battery in response to a specified condition such that a voltage drop is induced across the plus terminal and the minus terminal.

2. The method of claim 1, wherein the selectable load circuit further comprises:

a load having a first and second connection point wherein the first connection point is connected to one of the plus and minus terminals; and switch circuitry connected between the second connection point of the load and the remaining one of the plus and minus terminals, wherein the switch circuitry is operable to close to connect the load to the plus and minus terminals upon the occurrence of a specified condition to induce the voltage drop across the plus and the minus terminal.

3. The charge storage device of claim 2 wherein the load comprises a load resistor.

4. The charge storage device of claim 3 wherein the load resistor comprises a 200-Ohm resistor.

5. The charge storage device of claim 2 wherein the switch circuitry includes means for detecting battery temperature and wherein the specified condition comprises a specified temperature.

6. The charge storage device of claim 5 wherein the switch comprises a normally open bi-metallic switch.

7. The charge storage device of claim 5 wherein the selectable load includes a thermocouple and a selectable switch coupled thereto to receive a control signal wherein the thermocouple transmits the control signal to activate the selectable switch and to cause the selectable switch to close.

8. The charge storage device of claim 2 wherein the switch circuitry includes circuitry for measuring a voltage and wherein the specified condition is a specified voltage.

9. The charge storage device of claim 8 further comprising a logic device which includes an analog to digital converter and a selectable switch coupled thereto wherein the analog to digital converter is coupled to receive the input condition, namely, a voltage, and wherein the logic device is operable to produce a signal to the selectable switch to cause the selectable switch to close the circuit and to place the load across the plus and minus terminals when the voltage reaches a specified value.

10. The storage device of claim 2 wherein the load comprises a light emitting diode.

11. The charge storage device of claim 2 wherein the load comprises a thermistor.

12. The charge storage device of claim 2 wherein the switch circuit further comprises:
  a first switch biased to an open position operable to close to connect the load to the plus and minus terminals upon occurrence of the specified condition; and
  a second switch biased to a closed position operable to open to disconnect the load to the plus and minus terminals in response to a selected temperature of the load.

13. A charge storage device chargeable by a minus delta V termination charger, having a plus terminal and a minus terminal, comprising:
  a battery connected between the plus terminal and the minus terminal;
  a selectable load circuit connected between the plus terminal and the minus terminal the selectable load circuit selectively connectable in parallel with the battery in response to a specified condition such that a voltage drop is induced across the plus terminal and the minus terminal, the selectable load circuit further comprising:
  a resistive load;
  a normally closed bi-metallic switch; and
  a normally open bi-metallic switch, wherein the resistive load, the normally closed bi-metallic switch, and the normally open bi-metallic switch are all connected in series between the plus terminal and minus terminal.

14. The charge storage device of claim 13 wherein the resistive load is a light emitting diode.

15. A method of terminating a charge process for a battery, comprising the steps of:
  determining if a specified condition is met;
  closing a switch to place a load across a pair of battery terminals responsive to said specified condition;
  waiting a specified amount of time; and
  opening a switch to remove the load across the pair of terminals.

16. The method of claim 15 wherein the waiting step comprises the step of waiting at least 300 seconds.

17. A charge storage device having a plus terminal and a minus terminal, comprising:
  a load having a first and second connection wherein the first connection point is connected to one of the plus and minus terminals;
  logic circuitry for sensing the voltage across the plus terminal and the minus terminal and generate a digital signal in response thereto; and
  a selectable switch responsive to the digital signal to connect the load across the plus and minus terminals when the voltage reaches a specified value.

* * * * *

UNITED STATES PATENT AND TRADEMARK OFFICE
CERTIFICATE OF CORRECTION

PATENT NO.   : 5,907,232
DATED        : May 25, 1999
INVENTOR(S)  : Wakefield

It is certified that error appears in the above-identified patent and that said Letters Patent is hereby corrected as shown below:

<u>Title page,</u>
Item [54], delete "BATTERY WITH CHARGE CONTROL CIRCUITRY"
Insert -- CHANGE DEVICE OPERABLE WITH A MINUS DELTA V TERMINATION CHARGER --

Signed and Sealed this

Thirtieth Day of October, 2001

Attest:

NICHOLAS P. GODICI
*Attesting Officer*   *Acting Director of the United States Patent and Trademark Office*